(12) United States Patent
Bastioli et al.

(10) Patent No.: US 11,352,519 B2
(45) Date of Patent: Jun. 7, 2022

(54) STABLE AQUEOUS DISPERSIONS COMPRISING COMPLEXED STARCH

(71) Applicant: Novamont S.p.A., Novara (IT)

(72) Inventors: Catia Bastioli, Novara (IT); Luigi Capuzzi, Novara (IT); Paolo Magistrali, Novara (IT)

(73) Assignee: NOVAMONT S.P.A., Novara (IT)

( * ) Notice: Subject to any disclaimer, the term of this patent is extended or adjusted under 35 U.S.C. 154(b) by 554 days.

(21) Appl. No.: 16/191,813

(22) Filed: Nov. 15, 2018

(65) Prior Publication Data

US 2019/0085198 A1 Mar. 21, 2019

Related U.S. Application Data

(63) Continuation of application No. 14/345,549, filed as application No. PCT/EP2012/068433 on Sep. 19, 2012, now Pat. No. 10,160,877.

(30) Foreign Application Priority Data

Sep. 19, 2011 (IT) ............................. MI2011A001680
Jul. 18, 2012 (IT) ........................... MI2012A001253

(51) Int. Cl.
*C09D 103/00* (2006.01)
*C09D 103/02* (2006.01)
(Continued)

(52) U.S. Cl.
CPC ............ *C09D 103/00* (2013.01); *B05D 3/007* (2013.01); *C08L 3/02* (2013.01); *C08L 33/08* (2013.01); *C09D 103/02* (2013.01); *C09D 133/02* (2013.01); *D21H 17/28* (2013.01); *D21H 17/36* (2013.01); *D21H 17/37* (2013.01); *D21H 19/10* (2013.01); *D21H 19/12* (2013.01);
(Continued)

(58) Field of Classification Search
None
See application file for complete search history.

(56) References Cited

U.S. PATENT DOCUMENTS 5,032,683 A 7/1991 Dragner et al.
5,422,387 A 6/1995 Toms

FOREIGN PATENT DOCUMENTS

CN 1312838 A 9/2001
EP 0408503 A2 1/1991
(Continued)

OTHER PUBLICATIONS

International Preliminary Report on Patentability issued in corresponding Application No. PCT/EP2012/068433 dated Nov. 25, 2013.
(Continued)

*Primary Examiner* — Chinessa T. Golden
(74) *Attorney, Agent, or Firm* — Polsinelli PC (57) ABSTRACT

Provided is a stable aqueous dispersion suitable for application to different substrates and especially to paper substrates for producing a barrier layer against compounds of the saturated and aromatic hydrocarbon type. The aqueous dispersion comprises destructurized starch in a complexed form. Also provided is the use of aqueous dispersion as a coating composition for paper based substrates, as a microencapsulant of fragrances and as a film-forming component for paints.

17 Claims, 2 Drawing Sheets

(51) Int. Cl.
  *C08L 3/02* (2006.01)
  *D21H 17/28* (2006.01)
  *D21H 17/36* (2006.01)
  *D21H 17/37* (2006.01)
  *D21H 19/10* (2006.01)
  *D21H 19/12* (2006.01)
  *D21H 19/20* (2006.01)
  *D21H 19/34* (2006.01)
  *D21H 19/54* (2006.01)
  *D21H 19/58* (2006.01)
  *D21H 19/60* (2006.01)
  *B05D 3/00* (2006.01)
  *C09D 133/02* (2006.01)
  *C08L 33/08* (2006.01)
  *D21H 21/54* (2006.01)

(52) U.S. Cl.
  CPC .............. *D21H 19/20* (2013.01); *D21H 19/34* (2013.01); *D21H 19/54* (2013.01); *D21H 19/58* (2013.01); *D21H 19/60* (2013.01); *C08L 2201/54* (2013.01); *D21H 21/54* (2013.01); *Y10T 428/31982* (2015.04)

(56) References Cited

FOREIGN PATENT DOCUMENTS

| EP | 0965615 A1 | 12/1999 | |
|---|---|---|---|
| WO | WO-0162376 A1 | 8/2001 | |
| WO | WO-2006/097353 A1 | 9/2006 | |
| WO | WO-2007071791 A1 | 6/2007 | |
| WO | WO-2011/054892 A1 | 5/2011 | |
| WO | WO-2011/054926 A1 | 5/2011 | |
| WO | WO-2011054926 A1 * | 5/2011 | .............. C08L 67/02 |
| WO | WO-2011071742 A2 | 6/2011 | |

OTHER PUBLICATIONS

International Search Report issued in corresponding Application No. PCT/EP2012/068433 dated Jan. 14, 2013.

* cited by examiner

STABLE AQUEOUS DISPERSIONS COMPRISING COMPLEXED STARCH

CROSS REFERENCE TO RELATED APPLICATIONS

This application is a Continuation of application Ser. No. 14/345,549, now U.S. Pat. No. 10,160,877, filed on Sep. 19, 2012, as the National Phase of PCT/EP2012/068433 filed on Sep. 19, 2012; which in turn claims priority to Application No. MI2011A001680 filed in Italy on Sep. 19, 2011, and claims priority to Application No. MI2012A001253 filed in Italy on Jul. 18, 2012. The entire contents of all of these applications are hereby incorporated by reference.

DESCRIPTION

This invention relates to a stable aqueous dispersions suitable among other as coating composition for application to different type of substrates and especially for paper substrates producing a barrier layer against compounds of the saturated and aromatic hydrocarbon type such as for example the compounds commonly known as MOSH (Mineral Oil Saturated Hydrocarbons) and MOAH (Mineral Oil Aromatic Hydrocarbons). These aqueous dispersions are characterised in that they comprise destructurized starch in a complexed form. The use of recycled paper products has become increasingly important in the food packaging sector over the last few years. In fact to reduce the costs associated with the supply of raw materials, use of these materials through the recycling of paper and board wastes makes it possible to reduce the problems associated with disposal of the latter, as well as to reduce pollution due to incineration.

In order to be effectively used in the food packaging sector recycled paper products do however require surface treatments to create a barrier layer against various compounds, for example saturated and aromatic hydrocarbons.

Surface treatments make it possible to preserve foodstuffs safely, avoiding contamination.

It is in fact known that dry foodstuffs packed in recycled cardboard packaging may contain traces of saturated and aromatic hydrocarbons. The presence of these compounds is mainly due to the fact that the paper and board wastes used as a raw material in the production of recycled cardboard largely comprise newspaper, which is commonly printed with inks containing the said compounds, commonly referred to as "Mineral Oil Saturated Hydrocarbons" (MOSH) and "Mineral Oil Aromatic Hydrocarbons" (MOAH).

Coating compounds based on starch that can be applied to paper substrates are currently known in the literature and in commerce.

For example, in Maxwell C. S. "Effect of Ethylene Copolymer-Starch Blends on Water Resistance of Paper", Tappi 53 (8): 1464-1466 (1970), aqueous dispersions containing gelatinised starch and the ammonium salt of poly (ethylene-acrylic acid) are used to coat paper. These dispersions are however extremely viscous, even when the solids content is low, and this greatly reduces the possibility of uniformly depositing sufficiently large quantities of coating composition to allow the formation of a layer which will act as a barrier against the above-mentioned compounds. Such dispersions have a further disadvantage that gelatinised starch, which undergoes the phenomenon of retrogradation, precipitates out in the form of gels, making the process of deposition on paper appreciably more complex.

Starting from the technical problem described above it has now been surprisingly discovered that by using destructurized starch in complexed form it is possible to make stable aqueous dispersions having a high solids content capable of producing uniform bather layers which are resistant to saturated and aromatic hydrocarbons.

This invention in fact relates to an aqueous dispersion suitable for different applications particularly as coating composition for paper substrates characterised in that it comprises destructurized starch in a form complexed with at least one polymer containing groups of different hydrophilicity intercalated in the backbone or outside the backbone, said dispersion having dynamic viscosity of 10-500 mPa*s, preferably of 30-300 mPa*s, and a solid content of 5-55% by weight, preferably of 12-50% by weight.

The destructurized starch, in a form complexed with at least one polymer containing groups of different hydrophilicity intercalated in the backbone or outside the backbone, in fact disperses uniformly in water forming a dispersion of particles which shows particularly stable physical properties, in particular as regards dynamic viscosity.

In the meaning of this invention, appreciably stable dynamic viscosity means that the dynamic viscosity of the aqueous dispersion of the composition varies by less than 20%, preferably less than 10% after being allowed to stand without stirring for 14 days at 30° C. and then being stirred again for approximately 10 seconds.

This characteristic is particularly advantageous in the paper coating sector, in which coating compositions are generally deposited in the form of aqueous dispersions, as it eliminates the need to prepare the dispersion immediately prior to use. The aqueous dispersion according to the invention may be advantageously applied as coating composition on paper substrates.

The present invention refers also to the use of this aqueous dispersion to produce barrier layers against saturated and aromatic hydrocarbon compounds.

With regards to the dynamic viscosity, it can be measured on the aqueous dispersions according to the present invention by means of a Haake VT 500 viscosimeter (or another viscosimeter of equal performances) equipped with a MV-I rotor at 30° C. and 45 rpm. With regards to the solid content, it can be measured by weighing after drying up the aqueous dispersion to constant weight. In this regard, the aqueous dispersion according to the present invention may be placed into a thermobalance (i.e. Mettler Toledo HB-43-S Halogen thermogravimetric analyzer) at 140° C. for 30 minutes.

One particularly important aspect of the composition according to this invention lies in the fact that it is possible to adjust its dynamic viscosity either by varying the solids content within the range indicated above and also by reducing the molecular weight of the destructurized starch through chemical treatment, preferably with acids or bases, or through treatment with enzymes, while maintaining the structure of the dispersion. In the case of acid treatments the use of strong acids such as for example sulphuric acid is particularly preferred. The possibility of adjusting the dynamic viscosity of aqueous dispersions according to this invention makes it possible to use them under the conditions of use of conventional machines without modifications.

For example, for application on paper substrates dynamic viscosity values not in excess of 600 mPa*s are particularly advantageous.

Thanks to the combination of stable physical properties and dynamic viscosity, the stable aqueous dispersion according to this invention can also advantageously be used as a biodegradable filler in other sectors such as for example that of the production of rubbers, such as for example SBR (styrene-butadiene rubber), polybutadiene, poly-isoprene, EPDM (ethylene propylene diene monomer) rubbers, and natural rubbers.

The stable aqueous dispersion according to this invention can also advantageously be used as a film-forming component for paints, for example those which allow greater water vapour transpiration, and as a vehicle (known as a carrier) for active ingredients in various fields such as for example the pharmaceutical field (drugs), the agricultural field (insecticides and herbicides), cosmetics, biotechnology (fixing of enzymes or other forms of catalysts or microorganisms) or as a microencapsulant for fragrances in the food industry, pigments or labile substances (for example hydroperoxides) to increase their useful life.

Uses of the dispersion according to the invention as biodegradable filler for the production of rubbers, as film-forming component for paints and as a microencapsulant for fragrances are particularly preferred.

In a preferred embodiment the stable aqueous dispersion according to this invention comprises, with respect to the total weight of the dispersion:
45-95% by weight, preferably 50-88% by weight of water,
5-55% by weight, preferably 12-50% by weight, of a starch-based composition comprising, with respect to the total weight of the starch-based composition:
  i) 30-90% by weight, preferably 50-80%, of destructurized starch;
  ii) 10-70% by weight, preferably 20-50%, of at least one polymer containing groups of different hydrophilicity intercalated in the backbone or outside the backbone;
  iii) 0-25% by weight, preferably 0-20%, of plasticizers.

In the meaning of this invention, destructurized starch means starch of any kind which has substantially lost its native granular structure and is substantially free of granular structure residues. In the present invention, a destructurized starch which has lost its native granular structure and is free of granular structure residues is preferred. In this connection, the disclosure of EP 0 327 505 and EP 0118 240 is incorporated herein as reference. As far as the native granular structure of starch is concerned, this can advantageously be identified by phase contrast optical microscopy at 400× magnifications.

The content of residual granular structures and residues of the starch may be analyzed by means of a Brabender Viscograph-E Belotti amilograph under the following conditions:
Dry content: 23.1%
Temperature profile: Initial temperature (° C.)=25° C., heating rate (° C./min)=1.5 Peak Temperature=85° C.; Isothermal Step=30', cooling rate (° C./min)=1.5; Final Temperature (° C.)=25
Rpm=70

In the composition according to this invention, the content of starch residual granular structures and residues can lead to a maximum value of Braebender Units reached at the end of the above temperature profile ≤200, preferably ≤100 and more preferably ≤60 at a 23.1% of dry content.

The starch which can be used to prepare the stable aqueous dispersion according to this invention is native starch, such as for example maize starch, potato starch, rice starch, tapioca starch or starch which has been physically or chemically modified such as for example ethoxylated starch, starch acetate or starch hydroxypropylate, cross-linked starch, oxidised starch, dextrinised starch, dextrin and mixtures thereof. Particularly preferred is starch from maize, potato and mixtures thereof.

In the meaning of this invention, destructurized starch in complexed form means destructurized starch which shows one or more crystalline forms in an X-ray spectrometer which can be associated with one or more of the diffraction peaks listed below.

| Crystalline form | | |
|---|---|---|
| $V_H$ (2θ) | $V_A$ (2θ) | $E_h$ (2θ) |
| 7.4 (±0.3) | 7.7 (±0.3) | 7.0 (±0.2) |
| 12.8 (±0.2) | 13.5 (±0.4) | 12.0 (±0.3) |
| 16.7 (±0.2) | 15.7 (±0.1) | 13.1 (±0.3) |
| 18.3 (±0.2) | 17.6 (±0.1) | 18.2 (±0.4) |
| 19.7 (±0.3) | 19.3 (±0.2) | 24.9 (±0.2) |
| 22.2 (±0.2) | 20.8 (±0.2) | |
| 24.9 (±0.2) | 23.7 (±0.1) | |
| | 26.4 (±0.1) | |
| | 27.5 (±0.1) | |
| | 28.6 (±0.1) | |

It is well known that the crystalline forms of the complexed starch may pass from one form to another over time, due to their different thermodynamic stability.

In the dispersions according to the presence invention, the presence of destructurized starch in a complexed form provides for the dynamic viscosity range above disclosed.

Said polymers containing groups of different hydrophilicity intercalated in the backbone or outside the backbone are preferably insoluble in water. When the aqueous dispersions according to the present invention are applied as coating compositions on paper substrates, this makes it possible to render paper substrates water resistant. The polymers can be water dispersible. The meaning of the present invention, groups of different hydrophilicity show different Hansen solubility parameters.

The said polymers with groups of different hydrophylicity intercalated outside the backbone are advantageously selected from:
copolymers of ethylene with vinyl alcohol, acrylic acid and its salts, methacrylic acid and its salts, crotonic acid, itaconic acid and their salts, maleic anhydride, glycidyl methacrylate and mixtures thereof;
vinyl acetate/vinyl alcohol copolymers, preferably with <55% by moles of vinyl alcohol units in blocks;

The said polymers with groups intercalated in the backbone are advantageously selected from:
aliphatic polyurethanes, aliphatic and aliphatic/aromatic polyesters, preferably comprising repeating units of diacid or hydroxyacids with 6-20 carbon atom in the main chain, random or block polyurethane/polyether, polyurethane/polyester, polyamide/polyester, polyester/polyether, polyurea/polyester, polyurea/polyester copolymers, polycaprolactone/urethane, in which the molecular weight of the polycaprolactone blocks is between 300 and 3000.

Mixtures of the said polymers may also be used.

In case of polymers not water dispersible such as the ones with groups of different hydrophilicity intercalated in the backbone, the starch-based composition advantageously comprises polymers with more hydrophilic groups outside the backbone in a percentage 1-50% by weight related to the total polymeric component which act as dispersing agent Among the polymers containing groups of different hydrophilicity the ones with more hydrophilic groups intercalated outside the backbone are preferred.

Of these, copolymers of ethylene with vinyl alcohol and/or with acrylic acid are particularly preferred.

In the case of copolymers of ethylene with vinyl alcohol, these preferably contain 20-50% in moles of ethylene units.

In the case of ethylene copolymers with acrylic acid, these preferably contain 70-99% by weight of ethylene units.

Plasticizers are preferably selected from polyols having 2 to 22 carbon atoms, and among these polyols having 1 to 20 hydroxyl groups containing 2 to 6 carbon atoms, their ethers, thioethers and organic and inorganic esters are particularly preferred.

Examples of plasticisers are glycerine, diglycerol, polyglycerol, pentaerythritol, ethoxylated polyglycerol, ethylene glycol, polyethylene glycol, 1,2-propandiol, 1,3-propandiol, 1,4-butandiol, neopentyl glycol, sorbitol monoacetate, sorbitol diacetate, sorbitol monoethoxylate, sorbitol diethoxylate, and mixtures thereof.

The aqueous dispersion according to this invention may also contain additives, for example fillers, dispersants, crosslinking agents, surfactants, antifoaming agents, suspension agents, densifiers, preservatives, pigments and dyes.

As far as fillers are concerned, these may be inorganic and/or organic. Particularly preferred examples of inorganic fillers are: talc, clays, silica, mica, kaolin, titanium dioxide and wollastonite. Preferred organic fillers are derivatives of raw materials of renewable origin such as for example cellulose fibres. Fillers can be nanostructured.

Surfactants are advantageously selected from anionic, cationic and non-ionic surfactants. Cationic surfactants generally consist of a bulky cation often containing a long alkyl chain (for example a quaternary ammonium, a phosphonium or sulphonium salt). In most cases the anion is the chloride, sulphate or nitrate ion. Anionic surfactants generally consist of alkyl, aryl, alkyl aryl, styryl, di- or tristyryl sulphonates, sulphates, phosphates, phosphonates, dithiocarbamates, carboxylates generally neutralised by alkaline or alkaline earth metals, amines or alkanolamines.

Examples of non-ionic surfactants are products belonging to the classes of polyethoxylated esters and ethers, alkyl polyglucosides, derivatives of sorbitol and saccharose, fatty acid esters or amides, fatty acid mono- and diglycerides, ethoxylated alkyl phenols, di- or tristyryl phenol ethoxylates, ETO-propoxylate block copolymers.

Examples of antifoaming agents include silicone antifoaming agents and salts of fatty acids.

Pigments and dyes or colour stabilisers may also be added as necessary, for example titanium dioxide, clays, calcium carbonate, talc, mica, silica, silicates, iron oxides and hydroxides, carbon black and magnesium oxide.

According to the present invention, the starch-based composition comprising starch and at least one polymer containing groups of different hydrophilicity intercalated in the backbone or outside the backbone can be obtained by the processes of extruding a molten mixture with the provision of specific energy in excess of 0.15 kWh/kg during the said extrusion.

Preparation of the starch-based composition by extrusion takes place at for example temperatures between 120 and 210° C., and preferably between 140 and 190° C. Extruders which are suitable for use for preparing the composition according to this invention are mono and twin screw extruders. Twin screw extruders are preferred. The twin screw extruders having screws with mixing zones with highly working elements are more preferred. Mixing zones with "reverse" profile are also particularly suitable.

The preparation process of the stable aqueous dispersion according to the present invention, comprises the steps of:

(i) feeding the starch-based composition comprising starch in a form complexed with at least one polymer containing groups of different hydrophilicity intercalated in the backbone or outside the backbone to a dispersing machine equipped with a vessel and a stirring system comprising at least one rotor and at least one stator;

(ii) dispersing the starch-based composition in water by stirring vigorously with tangential speeds of from 10 $s^{-1}$ to 50 $s^{-1}$ until the dispersion is homogeneous and reaches a constant value of dynamic viscosity, and optionally (iii) regulating the aqueous dispersion solid content by adding or removing (e.g. by evaporation) the proper amount of water to reach a solid content of 5-55% by weight, preferably 12-50% by weight.

Examples of dispersing machines suitable to prepare the aqueous dispersion according to the present invention are high shear mixers, homogenizers such as IKA Ultra-Turrax T25 and IKA DR2000/1. The preparation process of the aqueous dispersion may be performed in batch or in continuous.

In step (i) the starch-based composition may be fed to the dispersing system in pellet or powder form. The powder may be obtained by grinding the pellets.

In the preparation of the aqueous dispersion according to the invention between step (i) and (ii) the starch-based composition may be left under stirring at 1500-3000 rpm for 20-80 minutes (so-called wetting time).

During step (ii), acids, bases or enzymes can be advantageously added followed by neutralisation. In the case of acid, the use of strong acids such as for example sulphuric acid in an amount of 0.1-2% by weight, preferably 0.2-1% by weight, is particularly preferred. In this case, neutralization may be performed with alkaline compounds such as for example NaOH, $NH_4OH$, $Ca(OH)_2$.

The stable aqueous dispersion according to this invention may be applied to paper substrates using any of the processes known to those skilled in the art. Preferably the aqueous dispersion will be applied using for example blade or film methods for coating paper.

Said coating processes comprise the steps of:
i. applying on at least one face of said paper substrate a layer of the aqueous dispersion according to the invention as a coating composition;
ii. drying said paper substrate comprising at least one layer of the coating composition.

Regarding the application step, it can be advantageously used application systems with one or more applicator rolls (e.g. size press, film press), with jets (e.g. jet flow), with offset-print or any combination thereof. Between steps (i) and (ii), the coating process can furthermore advantageously comprise the partial removal of the applied coating composition from the paper substrate, thus allowing the adjustment of grammage at the same time levelling the thickness of the coating layer. Said removal can advantageously be performed by means of one or more metal blades, by means of one or more air jets (so-called air-blade technology) or by mean of one or more air blade (so-called air-knife technology) or any combination thereof.

As far as the drying step of the coated paper substrate is concerned, it can be advantageously performed by means of radiation systems, preferably with infra-red radiations, convection systems, preferably with hot air, or contact systems, preferably with drying rollers, or any combination thereof.

In a preferred embodiment, the present invention refers to a coating process comprising the steps of:

i. applying on at least one face of said paper substrate a layer of the aqueous dispersion according to the present invention as a coating composition by means of one or more applicator rolls,
ii. removing part of the coating composition applied on the paper substrate by means of one or more air-knifes;
iii. drying, by means of radiation, convection, contact or any combination thereof, said paper substrate comprising at least one layer of said coating composition.

The present invention refers also to the coating composition obtainable with the above process.

The paper laminate obtained with the above disclosed coating processes comprises at least one substrate of the paper type and at least one layer of the coating composition according to the present invention. Thanks to the characteristics of the aqueous dispersion according to the invention this laminate has a uniform layer of coating and high barrier properties against saturated and aromatic hydrocarbon compounds, which makes it particularly useful for the manufacture of packaging in the food sector.

The said paper laminate may also advantageously be subjected to further extrusion coating and/or extrusion lamination treatments with biodegradable polymer materials such as for example the polyesters described in patent application WO 2009/118377, to form a particularly effective barrier layer against water which also renders the said laminate suitable for the packaging of liquids and various types of foods such as among others meat, ice cream, yoghurt and foods which are particularly sensitive to oxidation and/or moisture such as toasts, coffee and potato chips.

In the meaning of this invention the term "paper substrate" here includes all materials comprised of vegetable fibre raw materials, for example cellulose fibres. Suitable examples are paper-based substrates among which paper sheets and cardboards with a basic weight from 10 to 1000 g/m$^2$ are particularly preferred.

In a preferred embodiment the coating composition is biodegradable and therefore particularly suitable for the manufacture of laminated paper products which are biodegradable by composting according to standard EN 13432.

This invention will now be illustrated with reference to some non-limiting examples.

Example 1

56.3 parts of native maize starch (containing 12% by weight of water), 24.8 parts of polyethylene acrylic acid containing 20% by weight of acrylic acid, 7.9 parts of glycerine and 10.1 parts of water have been fed to an OMC twin screw extruder in accordance with the following operative conditions:
thermal profile
feed zone (° C.): 60
extrusion zone (° C.): 145-170-180×4-150×2 throughput (kg/h)=40
SME (specific energy) (kWh/kg)=0.232

Example 2

49.6 parts of native maize starch (containing 12% by weight of water), 27.5 parts of polyethylene vinylalcohol containing 38% by mole of ethylene, 4.6 parts of polyethylene acrylic acid containing 20% by weight of acrylic acid, 7.2 parts of glycerine and 11.4 parts of water have been fed to a TSA twin screw extruder in accordance with the following operative conditions:
thermal profile
feed zone (° C.): 70
extrusion zone (° C.): 70-180×5-160
throughput (kg/h)=3
SME (specific energy) (kWh/kg)=0.199

The compositions according to Examples 1 and 2 have been grounded up at 25° C. and sieved to a particle size of <250 μm and analysed in a Philips X'Pert θ/2θ x-ray spectrometer using a Bragg-Brentane geometry, using X Cu $K_\alpha$ radiation with λ=1.5416 Å and a power of 1.6 kW. The angular range used was from 5 to 60° (2θ) with steps of 0.03° (2θ) and an acquisition time of two seconds per step.

Analysis of the X-ray pattern revealed the presence of diffraction peaks shown in table 1 indicating formation of the complex between the starch and the polymers containing hydrophobic groups intercalated with hydrophobic sequences ($E_H$, $V_H$ and $V_A$ forms).

TABLE 1

| diffraction peaks of the Compositions according to Examples 1 and 2 | |
| --- | --- |
| Example 1 (2θ) | Example 2 (2θ) |
| 6.8 | — |
| 11.8 | — |
| — | 12.7 |
| 13.1 | — |
| 18.1 | — |
| 20.7 | — |

The compositions according to Example 1 and 2 have been grounded up at 25° C. and sieved to a particle size of <250 μm have been analyzed by means of a Brabender Viscograph-E Belotti amilograph under the following conditions:
Dry content: 23.1%
Temperature profile: Initial temperature (° C.)=25° C., heating rate (° C./min)=1.5 Peak Temperature=85° C.; Isothermal Step=30', cooling rate (° C./min)=1.5; Final Temperature (° C.)=25
Rpm=70

Viscosity of Example 1 and 2 in terms of Brabender Units (BU) are respectively of 8 and 6 BU.

Comparative Example 1

15.2 g of sodium hydroxide (≥97%, Fluka) have been dissolved into 700 ml of deionised water at 95-100° C. under stirring, in a 1 l conical flask equipped with a condensing system.

Once all the sodium hydroxide is dissolved, 70 g of poly(ethylene-co-acrylic acid) (EAA—20% by weight of acrylic acid) Dow Primacor 59801 have been added keeping the system in the same conditions (stirring, temperature and condenser) leaving a reaction time of three hours. The solution is then let to cool down up to 50-60° C. and discharged into aluminium vessels. The aluminium vessels have been put into an oven at 60° C. for 12 hours in order to remove the excess of water and then the obtained salt has been removed by scratching it from the aluminium vessels using a steel spatula. The water content of the obtained salt has been measured by means of thermogravimetrical analysis (Perkin Elmer TGA 7) at 120° C. for 2 hours resulting 9.3%.

7.48 g of EAANa have been dissolved into 400 ml of deionised water at 50° C. and the solution has been then let cooling down to ambient temperature. An amount of 17 g of native corn starch has been added to the solution and put into a Brabender Viscograph-E Belotti under the following conditions:
Temperature profile: Initial temperature (° C.)=25° C., heating rate (° C./min)=1.5 Peak Temperature=85° C.; Isothermal Step=30', cooling rate (° C./min)=1.5; Final Temperature (° C.)=25
Rpm=70

The viscosity of Comparative Example 1 in terms of Brabender Units (BU) at the end of the cycle is approximately 70 BU.

Comparative Example 2

12.2 g of EAANa prepared according to Comparative Example 1 have been dissolved into 400 ml of deionised water at 50° C. and the solution has been then let cooling down to ambient temperature. An amount of 41.4 g of native corn starch has been added to the solution and put into a Brabender Viscograph-E Belotti under the following conditions:
Temperature profile: Initial temperature (° C.)=25° C., heating rate (° C./min)=1.5 Peak Temperature=85° C.; Isothermal Step=30', cooling rate (° C./min)=1.5; Final Temperature (° C.)=25
Rpm=70

The viscosity of Comparative Example 2 in terms of Brabender Units (BU) at the end of the cycle is approximately 250 BU.

Examples 3 to 6

The compositions according to Example 1 and 2 have been water dispersed using the procedures listed in Table 2.

TABLE 2 procedures for preparing the dispersions according to Examples 3 to 6

|  | Example 3 | Example 4 | Example 5 | Example 6 |
|---|---|---|---|---|
| Machine | IKA Ultra-Turrax T25 | IKA Ultra-Turrax T25 | IKA DR2000/10 | IKA DR2000/10 |
| Recirculating system | no | no | yes | yes |
| Grinding and sieving <400 μm | no | no | yes | yes |
| Wetting time (under stirring) before dispersion (min) | — | — | 60 | 60 |
| Composition according to Example 1 (kg) | 0.01 | 0.04 | 31 | — |
| Composition according to Example 2 | — | — | — | 20 |
| water (kg) | 0.1 | 0.1 | 72 | 80 |
| water/sulfuric acid (96%) 50/50 (m/m) solution (kg) | 0.002 | 0 | 2.1* | 0 |

TABLE 2-continued procedures for preparing the dispersions according to Examples 3 to 6

|  | Example 3 | Example 4 | Example 5 | Example 6 |
|---|---|---|---|---|
| Tangential speed (s$^{-1}$) | 24 | 24 | 28 | 28 |
| Vessel Volume (dm$^3$) | 0.25 | 0.25 | 150 | 150 |
| Steady stirring revolution speed (1/min) | 24000 | 24000 | 5040 | 5040 |
| Stirring time(min) | 20 | 20 | 150 | 180 |
| Initial temperature (° C.) | 25 | 25 | 30 | 30 |
| Final temperature (° C.) | 80 | 85 | 90 | 96 |

*the solution was added after 90 minutes of stirring

The dispersions according to example 3 and 5 have been neutralised with 50% m/m sodium hydroxide solution.

The dispersions according to example 3 to 6, appeared milky and without lumps.

The dispersions according to Examples 3 to 6 and Comparative Examples 1 and 2 have been characterized by dynamic viscosity, melt viscosity, Phase Contrast Optical Microscopy and X-ray diffraction (of the dried dispersion).

The dynamic viscosity of Example 3 (approximately 9% of dry content) and Example 5 (approximately 30% of dry content) and of Comparative Example 1 (approximately 5.5% of dry content) and Comparative Example 2 (approximately 9% of dry content) has been analyzed over a period of two weeks by means of an Haake VT 500 viscometer equipped with an MV-I rotor at 30° C. and 45 rpm. All the aged sample have been previously shacked for 10 seconds in order to homogenize them.

TABLE 3 dynamic viscosity (mPa * s) over time

| Time (gg) | Comparative Example 1 | Comparative Example 2 | Example 3 | Example 5 |
|---|---|---|---|---|
| 0 | 162 | 623 | 72 | 133 |
| 1 | 144 | 615 | 70 | 131 |
| 2 | 145 | 620 | 72 | 129 |
| 3 | 140 | 605 | 72 | 132 |
| 7 | 134 | 334 | 70 | 134 |
| 14 | 120 | 310 | 72 | 133 |

While Comparative Examples 1 and 2 show a decreasing viscosity during the two weeks period that is especially remarkable for Comparative Example 2 (higher dry content), the viscosity of Example 3 and Example 5 remains constant.

It has to be highlighted that Comparative Example 1 has approximately the same viscosity of Example 5 but with a solid content of 5.6% against 30%. On the contrary, Comparative Example 2, having the same solid content of Example 3, shows a dynamic viscosity one order of magnitude higher. This is a focal point in order to obtain a significant basic weight of barrier material with a single deposition step keeping the viscosity at a low level, suitable for industrial deposition.

The dispersions according to Examples 4 and 5 have been dried by casting at air at ambient temperature and pelletized. About 30 g of these dried dispersions has been conditioned to a water content of 6.6% (measured by weight loss after 2 h at 120° C.) and a rheological flow curve has been obtained by means of a Göttfert RT2000/V capillary rheometer according to ASTM D-3835 (at T=180° C., L/D=10).

TABLE 4

| | melt viscosity | |
|---|---|---|
| | Example 4 $\eta$ (Pa * s) | Example 5 $\eta$ (Pa * s) |
| Initial shear rate ($s^{-1}$) = 7.2 | 6100 | 344 |
| Final shear rate ($s^{-1}$) = 292 | 481 | 35 |

The dried dispersion according to Example 4, where acid is not used, shows a pseudoplasic flow curve trend with viscosity value of an order of magnitude higher than Example 5_where acid is used. This shows how it is possible to adjust the viscosity of the dispersions by reducing the molecular weight of the destructurized starch.

Figure 1:
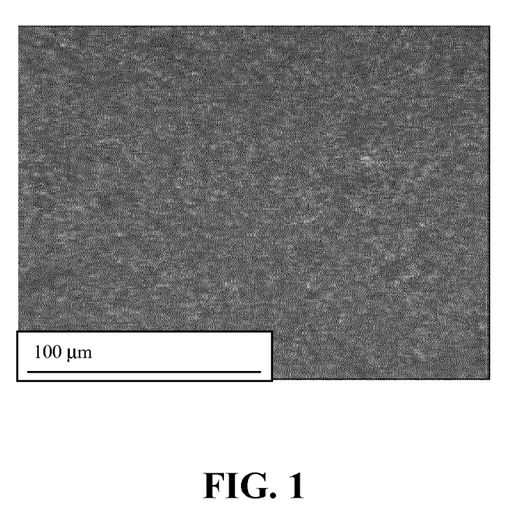
FIG. 1 shows a phase contrast microscopy photograph of the dispersion according to Example 5.

Phase contrast optical microscopy has been performed on the dispersion according to Example 5 by means of a Leitz Wetzlar Orthoplan model phase contrast optical microscope using the following parameters: magnification 400×, objective EF 40/0.65 Phaco 2, phase ring no. 5. A drop of dispersion has been placed on a microscopic glass with a Pasteur pipette and observed after having placed another microscopic glass onto it and thinned the thickness with a gentle pressure. The dispersion proved to be free of any residues with a granular structure that could be attributed to native starch or to granular starch residues, thus providing evidence of the destructurized nature of the starch (see FIG. 1)

X-ray diffraction of the dried dispersion according to Example 5 and Comparative Example 1 has been performed by means of a Philips X'Pert θ/2θ x-ray spectrometer equipped with a Bragg-Brentano geometry, using X Cu $K_\alpha$ radiation with λ=1.5416 Å and a power of 1.6 kW. The angular range used was from 5 to 60° (2θ) with steps of 0.03° (2θ) and an acquisition time of two seconds per step.

Analysis of the X-ray pattern revealed the presence of diffraction peaks shown in table 5 indicating loss of native starch crystallinity and formation of the complex between the starch and the polymers containing hydrophobic groups intercalated with hydrophobic sequences ($V_H$).

TABLE 5

| diffraction peaks of the dispersion according to Example 5 and Comparative Example 1 | |
|---|---|
| Example 5 (2θ) | Comparative Example 1 (2θ) |
| 12.9 | — |
| — | 18.5 |
| 19.7 | — |

In this case, it can be highlighted that the diffraction peaks present in the dried dispersion according to Example 5, differs from the diffraction peaks detected for the composition according to Example 1. Without willing to be bound to any theory, it is believed that this change in the diffraction peaks distribution is linked to the transition from a crystalline form to another during the preparation of the dispersion.

Example 7

A recycled cardboard sheets of A4 size of 450 μm thickness has been coated in a single deposition step with approximately 10 ml of dispersion according to Example 5 by means of a pipette and removing the excess of dispersion by rolling a steel rod long 40 cm and having a diameter of 7 mm. Straight after deposition, the cardboard has been put in an oven at 200° C. for 30 s for drying it.

Then it has been let to condition at ambient temperature overnight.

A basic weight of dry coating of approximately 15 g/m$^2$ has been obtained with a single deposition step.

Example 8

A recycled cardboard sheets of A4 size of 450 μm thickness has been coated in a single deposition step with approximately 10 ml of dispersion according to Example 6 by means of a pipette and removing the excess of dispersion by rolling a steel rod long 40 cm and having a diameter of 7 mm. Straight after deposition, the cardboard has been put in an oven at 200° C. for 30 s for drying it.

Then it has been let to condition at ambient temperature overnight.

A basic weight of dry coating of approximately 13 g/m$^2$ has been obtained with a single deposition step.

The coated cardboards according to Example 7 and 8 have been cut into approximately 30 pieces of nearly 8×3 cm. A pair of pieces has been sunk for half of their length in a 100 ml becker filled with deionised water for nearly 5 seconds. Then the sunk coated faces of one piece has been slightly scratched for a few seconds to the sunk coated face of the other piece and mostly of the coating has been moved from the cardboard into the water. This operation has been repeated on the other half of the two pieces for all the 30 pieces.

The water has been removed by a gentle air flow under mild heating (i.e. 60° C.) and a final drying step has been performed in an oven at 120° C. for 2 hours.

At the end of this step an amount of approximately 500 mg to 1 g of dry coating has been obtained which once pulverized with mortar and pestle has been analyzed by X-ray diffraction by means of a Philips X'Pert θ/2θ x-ray spectrometer using a Bragg-Brentano geometry, using X Cu $K_\alpha$ radiation with λ=1.5416 Å and a power of 1.6 kW. The angular range used was from 5 to 60° (2θ) with steps of 0.03° (2θ) and an acquisition time of two seconds per step.

Analysis of the X-ray pattern revealed the presence of diffraction peaks shown in table 7 indicating of the presence of the complex between the starch and the polymers containing hydrophobic groups intercalated with hydrophobic sequences ($V_H$ and $V_A$).

TABLE 7

| diffraction peaks of the coating composition after removal from the cardboard | |
|---|---|
| Example 7 (2θ) | Example 8 (2θ) |
| 13.1 | 12.8 |
| 19.6 | 19.6 |
| 20.8 | |

This shows that the diffraction peaks of the complexed starch are detectable after removal from the cardboard of the coating composition.

A piece of 5×5 mm size of the cardboards according to Example 7, 8 and untreated cardboard has been gold coated by means of an Agar B7341 sputter coater at a current strength of 40 mA for 40 seconds.

Figure 2:
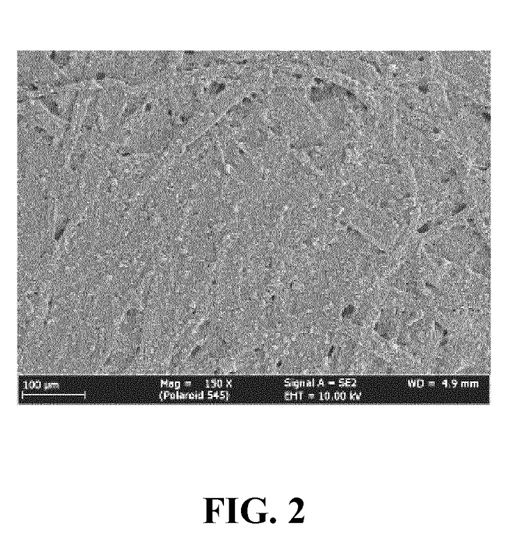
FIG. 2 shows a 150×SEM photograph of the cardboard according to Example 7.
Figure 3:
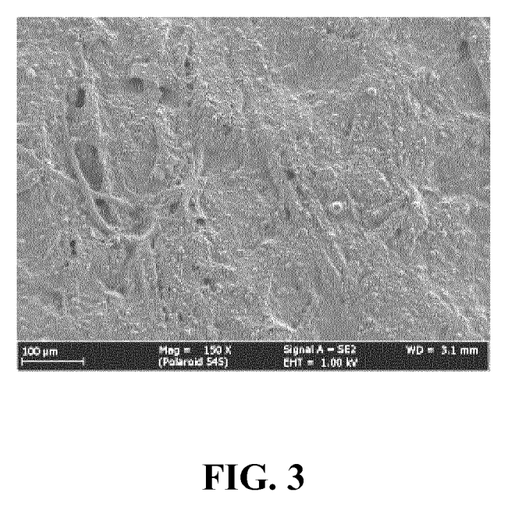
FIG. 3 shows a 150×SEM photograph of the cardboard according to Example 8.
Figure 4:
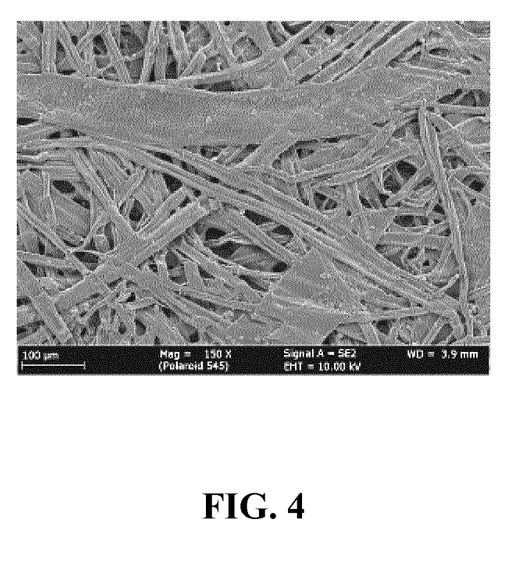
FIG. 4 shows a 150×SEM photograph of a cardboard without any coating composition.

Then the samples have been analysed using a Zeiss Supra 40 scanning electron microscope with the following operative conditions:

magnification: 150-1000× (with reference to Polaroid standard 545)
accelerating voltage=10 kV
working distance=approximately 5 mm The cardboards coated according to Example 7 (see FIG. 2) and 8 (see FIG. 3) show a uniform surface, i.e. a substantially complete coverage of the surface cellulose fibres present on the surface of the untreated cardboard (see FIG. 4)

Determination of the Barrier Effect Against Saturated and Aromatic Hydrocarbons of the Dispersion According to Example 5

Preparation of the Polluting Solutions

PS1: a solution made of (w/w): Hexadecane (Sigma-Aldrich Reagent Plus 99%) 92.0%, Phenanthrene (Acros Organics 97%) 6.6%, Hexacosane (hereinafter "C26H54") (Aldrich 99%) 1.7% has been prepared in a 20 ml flask under stirring at 70° C. for 3 hours.

PS2: a solution made of (w/w): Toluene (Sigma-Aldrich Chromasolv 99.9%) 99.29%, Perylene (Fluka 97%) 0.47%, C26H54 (Aldrich 99%) 0.24% has been prepared in a 20 ml flask under stirring at 80° C. for 3 hours.

Preparation of Polluted Cardboards

PC1: 25 µl of PS1 have been added (at approximately 70° C.) by means of an Hamilton 25 µl microsyringe to a piece of virgin cardboard of 270 µm thickness of 3.5×3.5 cm size and conditioned at ambient temperature for half an hour.

PC2: 240 µl of PS2 have been added (at approximately 80° C.) by means of an ILS 500 µl microsyringe to a piece of virgin cardboard of 270 µm thickness of 3.5×3.5 cm size. The solution addition has been made in three steps (3×80 µl) in order to avoid overflowing. The cardboard has been then conditioned at ambient temperature for half an hour.

PC3: a commercial recycled cardboard of 450 µm thickness of 7×7 cm size has been also taken as further Polluted Cardboard (PC3).

Coating of Polluted Cardboards a) Coating with the Dispersion According to Example 5
PC1, PC2 and PC3 have been coated in one single step with approximately 3 ml of dispersion according to Example 5 by means of a pasteur pipette removing the excess of dispersion by rolling a steel rod long 40 cm and having a diameter of 7 mm. Straight after deposition, the cardboards have been put in an oven at 200° C. for 30 s for drying it.

Then they have been let to condition at ambient temperature overnight.

The basic weight of the dry coating has been found to be of 15 g/m²

Test of Migration on Rice (PC1/PC2 Cardboards)

Approximately 6 g of rice (Riso Fino S. Andrea—Italy) have been put in two different weighing bottles of 55 mm of diameters covering homogeneously their bottom.

PC1-Example 5 and PC2-Example 5 have been put inside the weighing bottles with the polluted side facing the rice. In order to assure the contact between the cardboard and the rice a weight of 56 g over a surface of 23×23 mm has been put on the cardboard.

Then the weighing bottle has been covered and put in an oven at 40° C. for 9 days.

Test of Migration on Activated Charcoal (PC3 Cardboard)

Approximately 9 g of activated charcoal 8-20 mesh (Sigma Aldrich) have been put in one weighing bottle of 11 cm of diameters covering homogeneously their bottom.

PC3-Example 5 has been put inside the weighing bottle with the polluted side facing the activated charcoal. In order to assure the contact between the cardboard and the activated charcoal a weight of 97 g over a circular surface of 24 cm2 has been put on the cardboard. Then the weighing bottle has been covered and put in an oven at 70° C. for 24 hours.

Pollutant Extraction from PC1/PC2 Migration Test on Rice

At the end of migration test, activated charcoal or rice have been put inside a 50 ml flask and 20 ml of toluene (Sigma-Aldrich Chromasolv 99.9%) have been added. The flask has been heated up to 170° C. under stirring with a condensing system and the extraction has been carried on for 2 hours.

Pollutant Extraction from PC3 Migration Test on Activated Charcoal

At the end of migration test, activated charcoal or rice have been put inside a 50 ml flask and 30 ml of toluene (Sigma-Aldrich Chromasolv 99.9%) have been added. The flask has been heated up to 170° C. under stirring with a condensing system and the extraction has been carried on for 2 hours.

Pollutant Extraction from PC1/PC2/PC3 Cardboards (Reference)

In order to have a reference of the amount of MOSH and MOAH inside the cardboards, PC1, PC2 and PC3 have been cut in pieces of about 1.5×1.5 cm and put inside a 50 ml flask and 20 ml of toluene (Sigma-Aldrich Chromasolv 99.9%) for PC1/PC2 or 30 ml for PC3, have been added. The flask has been heated up to 170° C. under stirring with a condensing system and the extraction has been carried on for 2 hours.

Gas Chromatography-Mass Spectrometry (GC-MS) Analysis

An amount of 1 ml of liquid coming from the extraction has been filtered at 0.2 µl into 1 ml vials and sealed before performing GC-MS analysis in the following conditions:
Gas-Chromatograph: Thermo Trace GC Ultra;
Column: Phenomenex Zebron ZB-5MSi (length: 30 m—diameter: 0.25 mm;
Injector temperature (° C.)=300;
Transfer-line temperature (° C.)=280;
Carrier=Helium;
Flow (ml/min)=1;
Split Flow (ml/min)=50;
Temperature run:
Isothermal step (° C.-min)=70-4;
Temperature scan: $T_{in}$(° C.)=70—heating rate (° C./min)=15-$T_{fin}$(° C.)=340;
Isothermal step (° C.-min)=340-5;
Injection type: splitless;
Injection volume (µl)=1;
Mass Spectrometer: Thermo DSQ
Source temperature (° C.)=250;
Ionization type: ElectronImpact;
Scan Type: Polluted cardboard positive ion SIM; Recycled Cardboard: Full Scan
Peak detection for polluted cardboards (D): phenanthrene=178; C26H54=57+366; perylene=252
Peak detection for recycled cardboard (D): 33-500

Two repetitions of each sample have been analyzed by GC-MS and results are calculated in terms of peak area of the single molecular ion and percentage of reduction of the interested peak on treated samples compared to the reference).

For each pollutant, the barrier effect of the coating composition according to the invention has been determined according to the following formula:

$$\text{barrier effect} = \frac{(P_{reference} - P_{PCi\text{-}Example5})}{P_{reference}} \cdot 100$$

Wherein $P_{reference}$=peak area of the single molecular ion in the reference cardboard (without coating);

$P_{PCi\text{-}Example\ 5}$=peak area of the single molecular ion in the PC1, PC2 or PC3 cardboard (with coating layer obtained with the dispersion according to Example 5)

The results of the migration tests are reported in herebelow tables 8-10

TABLE 8

Results of migration on rice with PC1 cardboards

| | Barrier effect (%) |
|---|---|
| phenanthrene | 97.3 |
| C26H54 | 99.8 |

TABLE 9

Results of migration on rice with PC2 cardboards

| | Barrier effect (%) |
|---|---|
| Perylene | 100.0 |
| C26H54 | 98.8 |

TABLE 10

Results of migration on activated charcoal with PC3 cardboards

| | Barrier effect (%) |
|---|---|
| Alkane C23H48 | 95.8 |
| Alkane C24H50 | 97.6 |
| Alkane C25H52 | 100.0 |
| Alkane C26H54 | 99.6 |
| Alkane C27H56 | 100.0 |

The invention claimed is:

1. A stable aqueous dispersion for a coating composition producing a barrier layer against saturated and aromatic hydrocarbon compounds, comprising starch which consists of destructurized starch in a form complexed with at least one polymer containing groups of different hydrophilicity intercalated in the backbone or outside the backbone, wherein said dispersion has a dynamic viscosity of 30-300 mPa*s and a solid content of 12-50% by weight, and wherein the destructurized starch is a starch that has substantially lost its native granular structure and is substantially free of granular structure residues; and the destructurized starch in a complexed form is a starch free of residues of granular structure that shows one or more crystalline forms of any of the type $V_H$, $V_A$ and $E_H$ as defined by the following:

| Crystalline form | | |
|---|---|---|
| $V_H$ (2θ) | $V_A$ (2θ) | $E_H$ (2θ) |
| 7.4 (±0.3) | 7.7 (±0.3) | 7.0 (±0.2) |
| 12.8 (±0.2) | 13.5 (±0.4) | 12.0 (±0.3) |
| 16.7 (±0.2) | 15.7 (±0.1) | 13.1 (±0.3) |
| 18.3 (±0.2) | 17.6 (±0.1) | 18.2 (±0.4) |
| 19.7 (±0.3) | 19.3 (±0.2) | 24.9 (±0.2). |
| 22.2 (±0.2) | 20.8 (±0.2) | |
| 24.9 (±0.2) | 23.7 (±0.1) | |
| | 26.4 (±0.1) | |
| | 27.5 (±0.1) | |
| | 28.6 (±0.1) | |

2. The stable aqueous dispersion according to claim 1, comprising, with respect to the total weight of the dispersion:
45-95% by weight of water, and
5-55% by weight of a starch-based composition comprising, with respect to the total weight of the starch-based composition:
i) 30-90% by weight of destructurized starch;
ii) 10-70% by weight of the at least one polymer containing groups of different hydrophilicity intercalated in the backbone or outside the backbone; and
iii) 0-25% by weight of at least one plasticizer.

3. The stable aqueous dispersion according to claim 2, wherein said at least one polymer containing groups of different hydrophilicity intercalated in the backbone or outside the backbone is selected from:
copolymers of ethylene with vinyl alcohol, acrylic acid and its salts, methacrylic acid and its salts, crotonic acid, itaconic acid and its salts, maleic anhydride, glycidyl methacrylate and mixtures thereof;
vinyl acetate/vinyl alcohol copolymers;
aliphatic polyurethanes, aliphatic and aliphatic/aromatic polyesters, random or block polyurethane/poly ether, polyurethane/poly ester, polyamide/polyester, polyester/poly ether, polyurea/polyester, polyurea/polyester copolymers, polycaprolactone/urethane, in which the molecular weight of the polycaprolactone blocks is between 300 and 3000.

4. The stable aqueous dispersion according to claim 2, wherein said at least one polymer containing groups of different hydrophilicity intercalated outside the backbone is at least one copolymer of ethylene with vinyl alcohol and/or with acrylic acid.

5. The stable aqueous dispersion according to claim 1, wherein said at least one polymer containing groups of different hydrophilicity intercalated in the backbone or outside the backbone is selected from:
copolymers of ethylene with vinyl alcohol, acrylic acid and its salts, methacrylic acid and its salts, crotonic acid, itaconic acid and its salts, maleic anhydride, glycidyl methacrylate and mixtures thereof;
vinyl acetate/vinyl alcohol copolymers;
aliphatic polyurethanes, aliphatic and aliphatic/aromatic polyesters, random or block polyurethane/poly ether, polyurethane/poly ester, polyamide/polyester, polyester/poly ether, polyurea/polyester, polyurea/polyester copolymers, polycaprolactone/urethane, in which the molecular weight of the polycaprolactone blocks is between 300 and 3000.

6. The stable aqueous dispersion according to claim 5, wherein said at least one polymer containing groups of different hydrophilicity intercalated outside the backbone is at least one copolymer of ethylene with vinyl alcohol and/or with acrylic acid.

7. The stable aqueous dispersion according to claim 1, wherein said at least one polymer containing groups of different hydrophilicity intercalated outside the backbone is at least one copolymer of ethylene with vinyl alcohol and/or with acrylic acid.

8. The stable aqueous dispersion according to claim 7, wherein said at least one copolymer of ethylene with vinyl alcohol contains 20-50% by moles of ethylene units.

9. The stable aqueous dispersion according to claim 7, wherein said at least one copolymer of ethylene with acrylic acid contains 70-99% by weight of ethylene units.

10. A barrier layer against saturated and aromatic hydrocarbon compounds obtained from the aqueous dispersion according to claim 1.

11. A coating composition for paper substrates obtained from the aqueous dispersion according to claim 1.

12. The coating composition according to claim 11, wherein the coating composition is obtainable by a coating process of a paper substrate comprising the steps of:
   i. applying on at least one face of said paper substrate a layer of the aqueous dispersion as a coating composition; and
   ii. drying said paper substrate comprising at least one layer of said coating composition.

13. The coating composition according to claim 12, wherein the drying of the paper substrate is effected by means of radiation, convection, contact or any combination thereof.

14. A biodegradable filler for the production of rubbers obtained from the aqueous dispersion according to claim 1.

15. A microencapsulant for fragrances obtained from the aqueous dispersion according to claim 1.

16. A film-forming component for paints comprising the aqueous dispersion according to claim 1.

17. A process for preparing the stable aqueous dispersion according to claim 1, comprising the steps of:
   i. feeding a starch-based composition comprising starch in a form complexed with at least one polymer containing groups of different hydrophilicity intercalated in the backbone or outside the backbone to a dispersing machine equipped with a vessel and a stirring system comprising at least one rotor and at least one stator; and
   ii. dispersing the starch-based composition in water by stirring vigorously with tangential speeds of from 10 $s^{-1}$ to 50 $s^{-1}$ until the dispersion is homogeneous and reaches a constant value of dynamic viscosity, and optionally
   iii. regulating the solid content of the aqueous dispersion by adding or removing the proper amount of water to reach a solid content of 5-55% by weight.

\* \* \* \* \*